Figure 1:
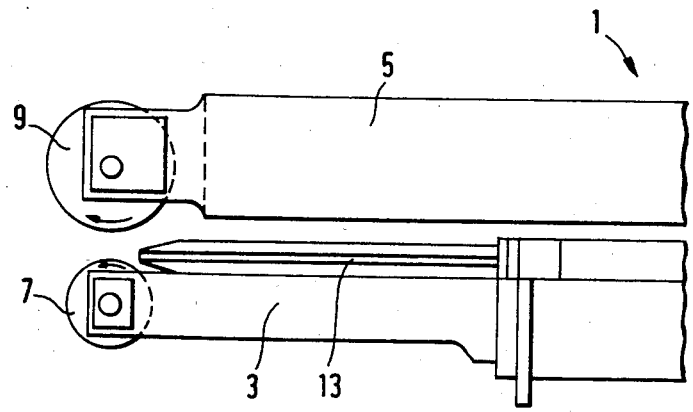

United States Patent [19]

Panknin et al.

[11] Patent Number: 4,568,812
[45] Date of Patent: Feb. 4, 1986

[54] DEVICE FOR ELECTRIC LONGITUDINAL-SEAM MASH RESISTANCE WELDING

[75] Inventors: Walter Panknin, Göppingen; Rolf Rühl, Rechberghausen; Gerhard Nockher, Ebersbach-Sulpach, all of Fed. Rep. of Germany

[73] Assignee: L. Schuler GmbH, Fed. Rep. of Germany

[21] Appl. No.: 631,553

[22] PCT Filed: Nov. 12, 1983

[86] PCT No.: PCT/DE83/00187
§ 371 Date: Jul. 9, 1984
§ 102(e) Date: Jul. 9, 1984

[87] PCT Pub. No.: WO84/01914
PCT Pub. Date: May 24, 1984

[30] Foreign Application Priority Data

Nov. 13, 1982 [EP] European Pat. Off. ........ 82110503.8

[51] Int. Cl.[4] .............................................. B23K 11/08
[52] U.S. Cl. .......................................... 219/64; 219/82
[58] Field of Search ....................... 219/64, 81, 82, 83, 219/84

[56] References Cited

U.S. PATENT DOCUMENTS 4,160,892 7/1979 Opprecht et al. ...................... 219/83

FOREIGN PATENT DOCUMENTS 44-30859 12/1969 Japan ...................................... 219/83
106480 7/1982 Japan ...................................... 219/64
2006659 5/1979 United Kingdom .

Primary Examiner—C. L. Albritton
Assistant Examiner—C. M. Sigda
Attorney, Agent, or Firm—Craig & Burns

[57] ABSTRACT

Device for the semiautomatic or fully automatic electric longitudinal-seam mash resistance welding of can bodies from overlapping, cut-to-size sheet-metal blanks rolled into sidewalls (20), with a guide arranged in front of the welding site for determining the lap width of the sidewall edges (21, 22) including resilient guide elements (32-34), whereby the sidewall edges (21, 22), when traveling toward the welding site, can be pressed against the bases (29, 30) of the groove of a Z-rail (13), and with a calibrating rim (40) arranged in the zone of the welding site, with such a construction of the guide means that the lap width of the sidewall edges (21, 22) at the welding site is at most six times the thickness of the can wall, and with wire electrodes (11) that can be pulled off a reel and are guided over electrode rollers (7, 9), these electrodes being fashioned as flat-wire electrodes (11) having a width exceeding the lap width of the sidewall edges (21, 22) at the welding site. In this arrangement, the Z-rail (13) and the bearing of the electrode rollers (7, 9) are to be simplified. For this purpose, parallel-extending groove bases (29, 30) of the Z-rail (13) are provided, and the axes of the electrode rollers (7, 9) are made to lie in the plane perpendicular to the welding direction.

2 Claims, 7 Drawing Figures

DEVICE FOR ELECTRIC LONGITUDINAL-SEAM MASH RESISTANCE WELDING

The invention relates to a device for the semiautomatic or fully automatic electric longitudinal-seam mash resistance welding of can bodies from overlapping, cut-to-size sheet-metal blanks rolled into sidewalls, with a guide means arranged in front of the welding site for determining the lap width of the sidewall edges including resilient guide elements, by means of which the sidewall edges, when traveling toward the welding site, can be pressed against the bases of the groove of a Z-rail, and with a calibrating rim arranged in the zone of the welding site, with such a construction of the guide means that the lap width of the sidewall edges at the welding site is at most six times the thickness of the can wall, and with wire electrodes that can be pulled off a reel and are guided over electrode rollers, these electrodes being fashioned as flat-wire electrodes having a width exceeding the lap width of the sidewall edges at the welding site.

In a conventional device of this type (German Pat. No. 2,559,671), the Z-rail is of such a configuration that the bases of the groove of the Z-rail converge in the direction toward the welding site along the lines of a continuously decreasing overlapping of the sidewall edges, and the axes of the electrode rollers are inclined with respect to the plane perpendicular to the welding direction in such a way that the sidewall edges are thereby pushed one on top of the other. One disadvantage in this known device resides in that the manufacture of a Z-rail of such configuration is difficult and expensive, and that a Z-rail of such a form can be correctly aligned at the device only with great effort. This drawback is especially disturbing in case Z-rails with groove bases converging under predetermined angles are associated with specific weld seam lengths, i.e. sidewall heights, and welding speeds, so that the Z-rail must be exchanged each time the manufacturing procedure undergoes conversion. It is furthermore disadvantageous in the known device that a high manufacturing accuracy and exact control are required for obtaining the correct inclined position of the axes of the electrode rollers.

It is an object of the invention to avoid the aforementioned disadvantages while simultaneously retaining an at least equally satisfactory operability of the device. In this connection, another objective resides in providing a Z-rail that can be produced and adjusted in a simple way, and in achieving a simpler manufacture and alignment of the bearings for the electrode rollers.

Accordingly, a feature of the invention resides, in a device of the type discussed hereinabove, wherein the groove bases of the Z-rail extend in parallel along the lines of an overlapping of the sidewall edges that remains the same, and in that the axes of the electrode rollers lie in the plane perpendicular to the welding direction.

It has been found surprisingly that a satisfactory operability of the device in connection with the welding of can bodies neither requires the configuration of the Z-rail heretofore considered necessary, nor needs the inclined positioning of the electrode rollers likewise heretofore considered a necessity. The invention furthermore has the advantage that the sidewalls even while being fed along the Z-rail, assume a shape more closely approaching a cylindrical configuration than in the conventional device where the sidewalls, in this zone, have a greater conicity. Furthermore, the invention has the advantage that the sidewalls are fed more smoothly inasmuch as there is no need for first creating an overlap that is too wide, and thereafter again reducing such overlap; in other words, the troublesome transition from increasing overlap to reduced overlap is avoided.

Finally, the form of the Z-rail provided by this invention facilitates regrinding of worn Z-rails for reuse in a welding step with greater overlap.

A further object of the invention is the provision of a device for the semi-automatic or fully automatic electric longitudinal-seam mash resistance welding of can bodies wherein an overlapping zone of two sidewall edges lies at least almost in the center of the width area of available contact surface of flat-wire electrodes.

Figure 2:
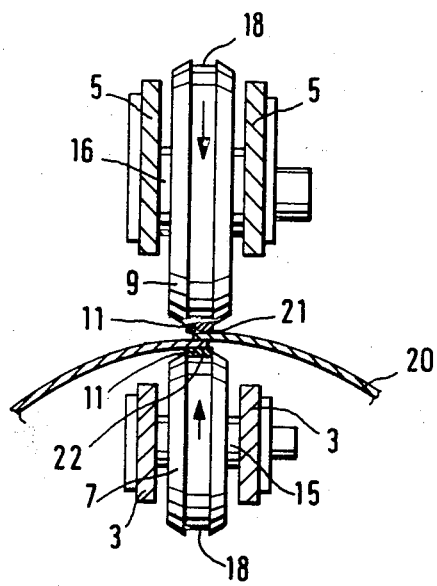
Figure 3:
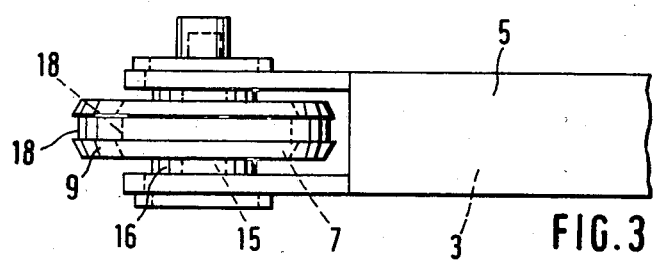
Figure 4:
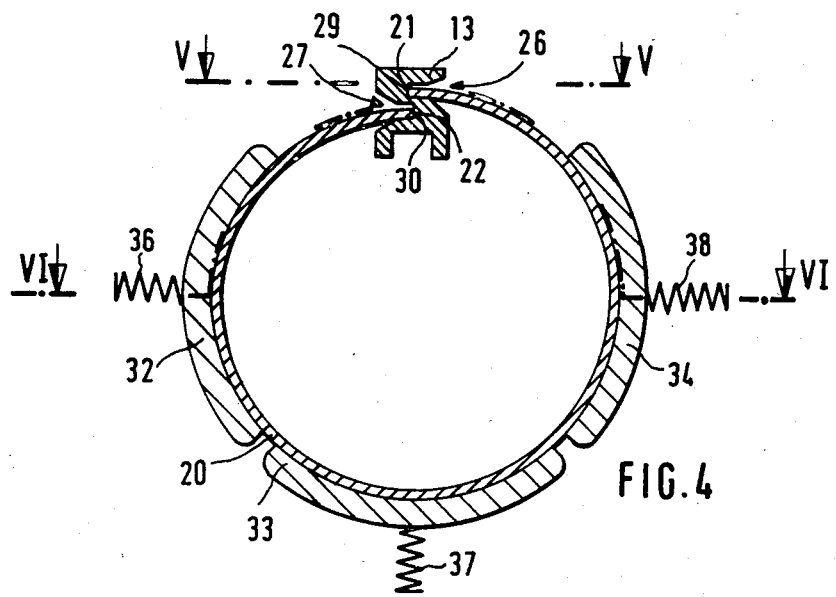
Figure 5:
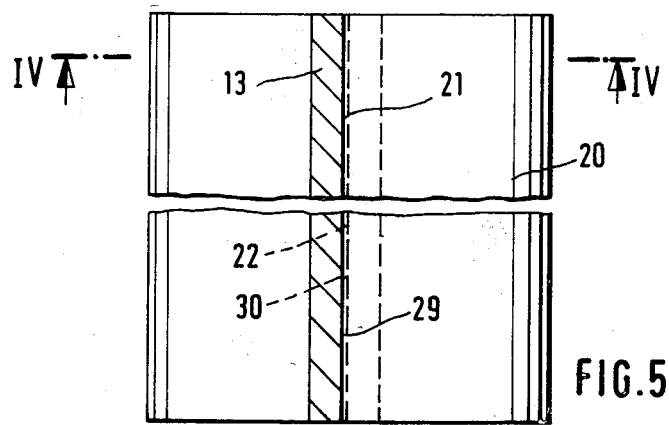
Figure 6:
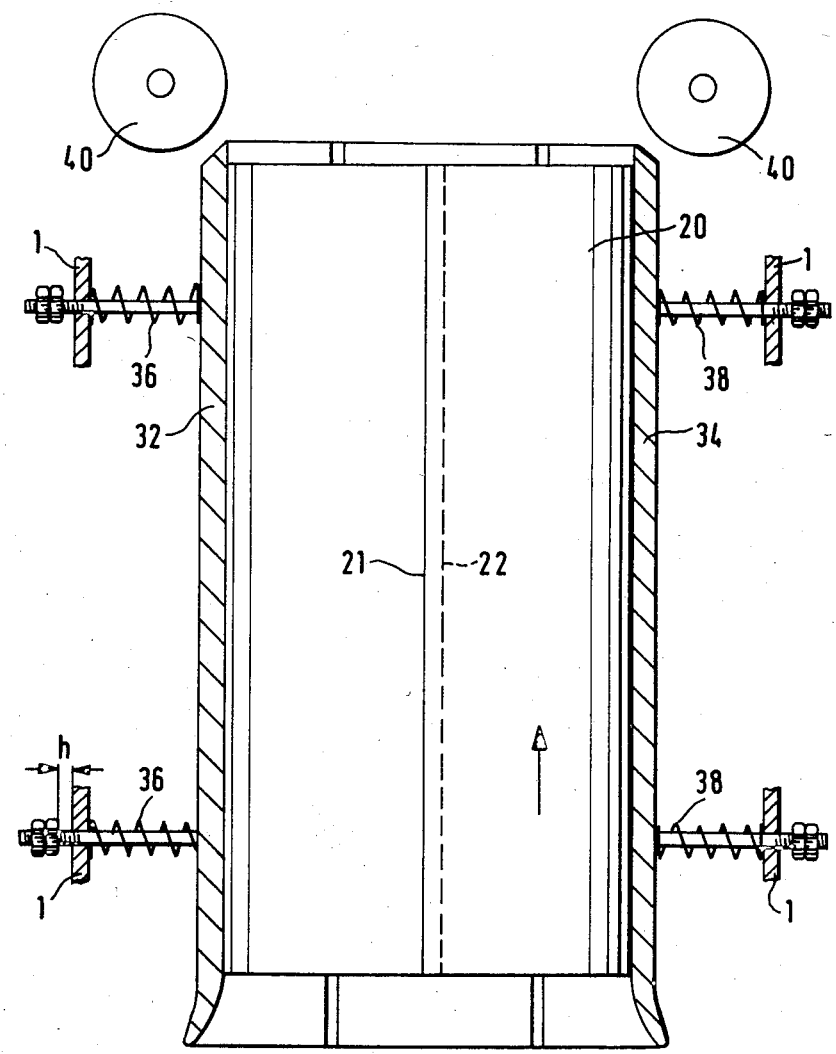
Figure 7:
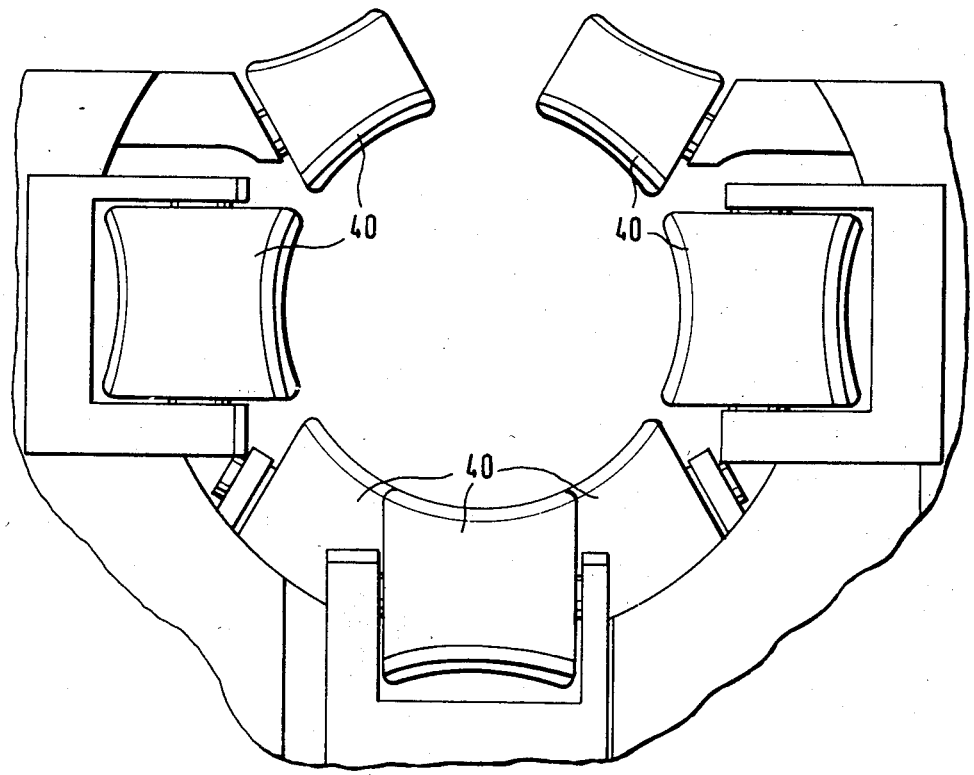

These and other objects, features and advantages of the present invention will become more apparent from the following description when taken in connection with the accompanying drawings which show, for the purposes of illustration only, one embodiment in accordance with the present invention, and wherein:

FIG. 1 shows a fragmentary view of an electric longitudinal-seam mash resistance welding machine with part of the machine frame and the welding arms with the corresponding electrode rollers, in a lateral illustration, FIG. 2 is an enlarged view of the electrode rollers with the sidewall inserted, as seen in the welding direction, FIG. 3 is a view of the electrode rollers according to FIG. 2 from above, FIG. 4 is a section through a Z-rail with a sidewall inserted therein, taken along section line IV—IV of FIG. 5, FIG. 5 shows a section through the Z-rail along section line V—V of FIG. 4, FIG. 6 is a section through the arrangement of FIG. 4 along section line VI—VI of FIG. 4, and FIG. 7 is a view of a calibrating rim, operating in the welding plane perpendicularly to the direction of travel of the sidewall.

Referring now to the drawings wherein like reference numerals are used to designate like parts and more particularly to FIG. 1 wherein is shown schematically a fragmentary view of an electric longitudinal-seam mash resistance welding machine 1 with a lower, fixed welding arm 3 and an upper, pivotable welding arm 5. A lower electrode roller 7 and an upper electrode roller 9 are attached to the ends of these welding arms 3, 5. A flat-wire electrode 11, shown in FIG. 2, is guided over these electrode rollers 7, 9, this electrode exhibiting an approximately rectangular cross section.

The electrode rollers 7 and 9 are equipped with corresponding roller journals 15 and 16, respectively, arranged in corresponding bifurcate ends of the upper and lower welding arms 3 and 5, respectively. The electrode rollers 7 and 9 have respectively one annular groove 18 to accommodate the flat-wire electrode 11. The flat-wire electrode 11, as can be seen from FIG. 2, projects correspondingly beyond the profile of the electrode rollers 7 and 9, but otherwise is in flush contact with the annular groove 18.

FIG. 4 shows, besides a Z-rail 13, also a sidewall 20 with the sidewall edges 21 and 22, which latter are introduced in the upper and lower grooves 26 and 27, respectively, and are pressed correspondingly, by means of laterally arranged guide jaws 32-34, onto an upper groove base 29 of the groove 26 and a lower groove base 30 of the groove 27. Adjustable springs 36-38, supported on one end at the welding machine and arranged respectively in pairs, urge the guide jaws 32-34 with the corresponding force onto the sidewall 20, which, in regard to an accurate guidance of the sidewall edges 21 and 22 and, in particular, their exact overlapping, is of decisive importance for a successful welding step. As can be seen from FIGS. 5 and 6, the two grooves 26 and 27 and/or groove bases 29 and 30 extend in parallel to each other along the lines of a uniform overlapping of the sidewall edges 21 and 22. This overlap, which remains the same in the direction of the welding operation, makes it possible to manufacture a welded article having a practically constant lap along the weld seam.

The electrode rollers 7 and 9, shown in FIG. 2, also act in the same sense, the axes of these rollers lying in the plane perpendicular to the welding direction.

It has proven to be advantageous along these lines to select the overlapping of the sidewall edges 21 and 22 at the welding site to be three to six times the thickness of the sheet metal whereas the width of the flat-wire electrode 11 can be correspondingly selected to be twice to three times the lap width.

In order to secure the uniform overlapping of the sidewall edges 21, 22, the sidewall 20 is pressed, by the guide jaws 32-34, into the groove bases 29 and 30, the contact pressure being adaptable to the circumstances by a corresponding tensioning or relaxing of the springs 36-38. In FIG. 6, the—adjustable—stroke h is illustrated. Without these guide jaws 32-34, a satisfactory contacting of the sidewall edges 21 and 22 in the Z-rail 13 cannot be ensured. The contact pressure of the guide jaws 32-34, of course, must not be too high since otherwise the sidewall edges 21, 22 can be damaged at the Z-rail 13, and/or these jaws present too great a resistance against the further transport of the sidewall 20. The three guide jaws 32-34 are followed—at the level of the welding site—by a calibrating rim of rotatable, fixedly arranged but adjustable calibrating rolls 40, as shown in FIG. 7 and indicated in FIG. 6. A number of narrowly opening, resilient centering rims could also be provided instead of the simpler guide jaws 32-34.

The sidewall edges 21 and 22 of the sidewall 20 to be welded together are introduced in overlapping relationship between the two sections of the flat-wire electrode 11 wherein the zone where the two sidewall edges 21 and 22 of the sidewall 20 overlap is narrower than the width of the sections of the flat-wire electrode 11. The amount of overlapping in relation to the width of the flat-wire electrode 11 can be varied, but the overlapping, in any event, is to be made narrower than the width of the flat-wire electrode 11. Preferably, the overlap lies in the center of the sections of the flat-wire electrode 11, the width of the lap corresponding approximately to half the width of the sections of the flat-wire electrode 11.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A device for one of semiautomatic and fully automatic electric longitudinal-seam mash resistance welding of can bodies formed from overlapping, cut-to-size sheet-metal blanks rolled into sidewalls, with a guide means arranged in front of the welding site for determining lap width of sidewall edges including resilient guide elements by means of which the sidewall edges, when traveling toward the welding site, can be pressed against bases of grooves of a Z-rail, and with a calibrating rim arranged in the zone of the welding site, wherein the guide means is constructed to effect a lap width of the sidewall edges at the welding site at most six times the thickness of a can wall, and with wire electrodes discharged from a reel and guided over electrode rollers, said electrodes being fashioned as flat-wire electrodes having a width exceeding the lap width of the sidewall edges at the welding site, characterized in that the groove bases of the Z-rail extend in parallel to each other along lines of an overlapping of the sidewall edges remaining constant and the axes of the electrode rollers lie in a plane perpendicular to the welding direction.

2. A device according to claim 1, characterized in that the overlapping zone of the two sidewall edges lies at least almost in the center of the width area of the available contact surface of the flat-wire electrodes.

* * * * *

REEXAMINATION CERTIFICATE (1065th)
United States Patent [19]
Panknin et al.

[11] B1 4,568,812
[45] Certificate Issued May 30, 1989

[54] DEVICE FOR ELECTRIC LONGITUDINAL-SEAM MASH RESISTANCE WELDING

[75] Inventors: Walter Panknin, Göppingen; Rolf Rühl, Rechberghausen; Gerhard Nockher, Ebersbach-Sulpach, all of Fed. Rep. of Germany

[73] Assignee: L. Schuler GmbH, Göppingen, Fed. Rep. of Germany

Reexamination Request:
No. 90/001,139, Dec. 12, 1986

Reexamination Certificate for:
Patent No.: 4,568,812
Issued: Feb. 4, 1986
Appl. No.: 631,553
Filed: Nov. 12, 1983

[22] PCT Filed: Nov. 12, 1983
[86] PCT No.: PCT/DE83/00187
§ 371 Date: Jul. 9, 1984
§ 102(e) Date: Jul. 9, 1984
[87] PCT Pub. No.: WO84/01914
PCT Pub. Date: May 24, 1984

[30] Foreign Application Priority Data
Nov. 13, 1982 [EP] European Pat. Off. ......... 82110503.8

[51] Int. Cl.⁴ .............................................. B23K 11/08
[52] U.S. Cl. .......................................... 219/64; 219/82
[58] Field of Search .......................... 219/64, 61.3, 67

[56] References Cited
U.S. PATENT DOCUMENTS

| | | | |
|---|---|---|---|
| Re. 26,658 | 11/1961 | McCoy | 219/64 |
| 3,834,010 | 9/1972 | Wolfe et al. | 219/64 X |
| 4,160,892 | 7/1979 | Opprecht et al. | 219/83 |
| 4,214,140 | 7/1980 | Opprecht | 219/61.3 |
| 4,540,879 | 9/1985 | Haerther et al. | 219/61.3 |

FOREIGN PATENT DOCUMENTS

| | | | |
|---|---|---|---|
| 1050938 | 2/1959 | Fed. Rep. of Germany | 219/64 |
| 2314553 | 10/1974 | Fed. Rep. of Germany | 219/64 |
| 44-30859 | 12/1969 | Japan | 219/83 |
| 106480 | 7/1982 | Japan | 219/64 |
| 175087 | 10/1982 | Japan | 219/81 |
| 370175 | 8/1963 | Switzerland | 219/81 |
| 429982 | 8/1967 | Switzerland | 219/64 |
| 2006659 | 5/1979 | United Kingdom | |
| 2096038 | 10/1982 | United Kingdom | 219/81 |

*Primary Examiner*—Clifford C. Shaw

[57] ABSTRACT

Device for the semiautomatic or fully automatic electric longitudinal-seam mash resistance welding of can bodies from overlapping, cut-to-size sheet-metal blanks rolled into sidewalls (20), with a guide arranged in front of the welding site for determining the lap width of the sidewall edges (21, 22) including resilient guide elements (32-34), whereby the sidewall edges (21, 22), when traveling toward the welding site, can be pressed against the bases (29, 30) of the groove of a Z-rail (13), and with a calibrating rim (40) arranged in the zone of the welding site, with such a construction of the guide means that the lap width of the sidewall edges (21, 22) at the welding site is at most six times the thickness of the can wall, and with wire electrodes (11) that can be pulled off a reel and are guided over electrode rollers (7, 9), these electrodes being fashioned as flat-wire electrodes (11) having a width exceeding the lap width of the sidewall edges (21, 22) at the welding site. In this arrangement, the Z-rail (13) and the bearing of the electrode rollers (7, 9) are to be simplified. For this purpose, parallel-extending groove bases (29, 30) of the Z-rail (13) are provided, and the axes of the electrode rollers (7, 9) are made to lie in the plane perpendicular to the welding direction.

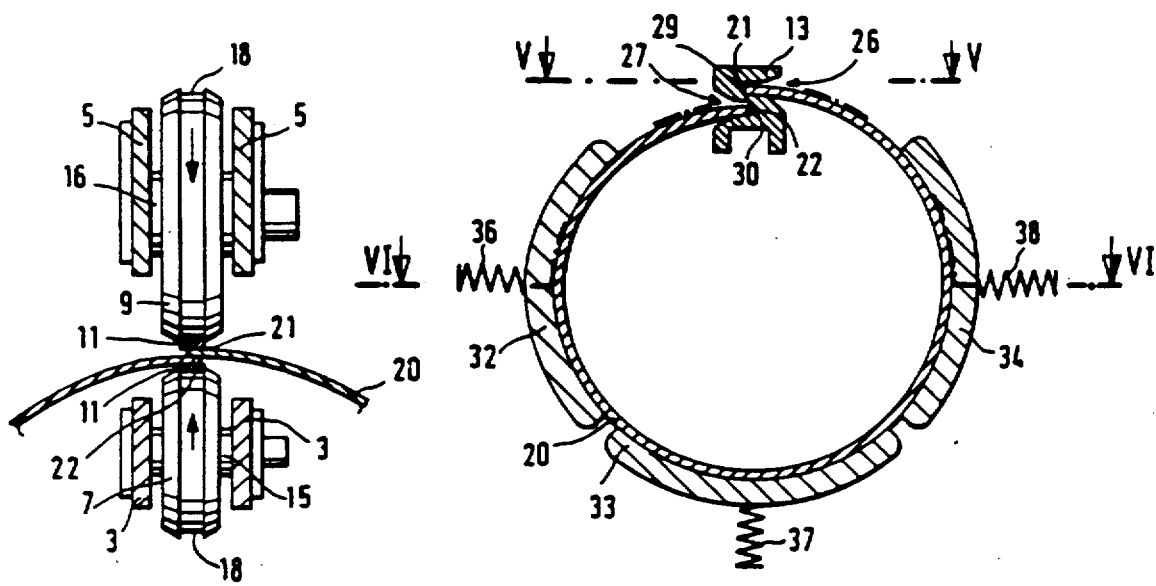

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *